US012790417B2

(12) United States Patent
Kim et al.

(10) Patent No.: US 12,790,417 B2
(45) Date of Patent: Nov. 10, 2026

(54) METHOD OF PRODUCING POLYETHYLENE

(71) Applicants: SK Innovation Co., Ltd., Seoul (KR); SK Geo Centric Co., Ltd., Seoul (KR)

(72) Inventors: Dong Kou Kim, Daejeon (KR); Maeng Sun Eo, Daejeon (KR); Mun Hyung Kang, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 526 days.

(21) Appl. No.: 18/484,484

(22) Filed: Oct. 11, 2023

(65) Prior Publication Data

US 2024/0124626 A1 Apr. 18, 2024

(30) Foreign Application Priority Data

Oct. 12, 2022 (KR) ........................ 10-2022-0130262

(51) Int. Cl.
*C08F 110/02* (2006.01)
*C08F 4/643* (2006.01)

(52) U.S. Cl.
CPC ............ *C08F 110/02* (2013.01); *C08F 4/643* (2013.01)

(58) Field of Classification Search
CPC ...... C08F 4/6555; C08F 4/643; C08F 110/02; C08F 10/02; C08F 4/651
See application file for complete search history.

(56) References Cited

U.S. PATENT DOCUMENTS

| | | | | |
|---|---|---|---|---|
| 4,672,050 A * | 6/1987 | Sasaki | C08F 10/00 502/115 |
| 4,990,479 A * | 2/1991 | Ishimaru | C08F 10/00 526/904 |
| 5,322,830 A * | 6/1994 | Sormunen | C08F 10/00 526/124.8 |
| 6,455,660 B1 * | 9/2002 | Clutton | C08F 10/00 526/159 |
| 2001/0031833 A1 * | 10/2001 | Kobayashi | C08L 23/0815 525/240 |
| 2002/0128402 A1 * | 9/2002 | Fujita | C08F 10/00 526/128 |

FOREIGN PATENT DOCUMENTS

| | | | |
|---|---|---|---|
| JP | 2008-115321 A | 5/2008 | |
| KR | 2005-0020996 A | 3/2005 | |
| KR | 20110090462 A * | 8/2011 | C08F 4/65916 |
| WO | 2009/004917 A1 | 1/2009 | |

* cited by examiner

*Primary Examiner* — Mark S Kaucher
(74) *Attorney, Agent, or Firm* — Jones Day

(57) ABSTRACT

The present disclosure relates to a method of producing polyethylene. More particularly, the present disclosure relates to a method of producing polyethylene capable of reducing wax produced after polymerization by washing a catalyst used in polymerization of ethylene under optimal conditions.

14 Claims, 1 Drawing Sheet

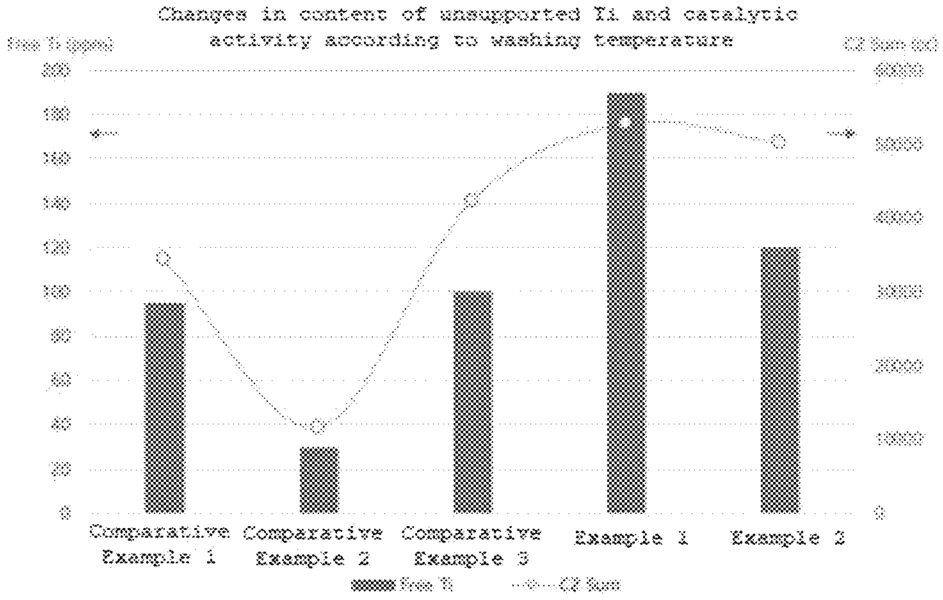
Changes in content of unsupported Ti and catalytic activity according to washing temperature
Comparative Example 1
Comparative Example 2
Comparative Example 3
Example 1
Example 2

METHOD OF PRODUCING POLYETHYLENE

CROSS-REFERENCE TO RELATED APPLICATIONS

This application claims priority under 35 U.S.C. § 119 to Korean Patent Application No. 10-2022-0130262, filed on Oct. 12, 2022, in the Korean Intellectual Property Office, the disclosure of which is incorporated herein by reference in its entirety.

TECHNICAL FIELD

The following disclosure relates to a method of producing polyethylene. More particularly, the following disclosure relates to a method of producing polyethylene that minimizes generation of wax.

BACKGROUND

Polyethylene is a commercially important polymer with a variety of uses. Polyethylene is usually produced on an industrial scale by polymerization of ethylene in the presence of a Ziegler-Natta catalyst composition. The components of the Ziegler-Natta catalyst composition affect, inter alia, molecular weight, bulk density, intrinsic viscosity, degree of crystallinity, and average particle size, as well as aspects of its production.

Ziegler-Natta catalysts are typically transition metal-supported catalysts prepared by supporting or immobilizing a transition metal or a transition metal precursor on a surface of a support. When the catalyst is prepared, unreacted transition metal may remain loose (or unsupported) on the surface or inside of the supported catalyst. The presence of this residual unreacted transition metal may cause side reactions during manufacture of polyethylene, generating polyethylene wax having a low molecular weight, which may deteriorate the quality of the polyethylene polymer. Therefore, it is important to remove any unreacted transition metal before using the catalyst for polymerization. However, an excessive amount of organic solvent is typically required in order to remove the unreacted transition metal, which results in environmental pollution and an increase in washing costs. Therefore, there is an unmet need in the art for a method of preparing a transition metal supported catalyst with minimal unreacted transition metal that can be used to producing polyethylene such that a polyethylene of high quality and low wax content can be prepared.

SUMMARY

An embodiment of the present disclosure relates to a method of producing a high-quality polyethylene polymer by reducing the amount of wax produced during production of polyethylene.

In one general aspect, a method of producing a polyethylene polymer comprises:

S1) introducing a transition metal into a support to generate a composition comprising a transition metal-supported catalyst and unsupported transition metal, wherein the transition metal-supported catalyst has an initial catalytic activity;

S2) washing the transition metal-supported catalyst with an organic solvent a total of two to ten times in a first stage at a first temperature $T_1$ and in a second stage at a second temperature $T_2$ to generate a washed transition metal-supported catalyst;

S3) introducing the washed transition metal-supported catalyst into a reactor and then injecting ethylene gas into the reactor under conditions effective to produce a polyethylene polymer; and S4) washing the produced polyethylene polymer, wherein $T_1$ is about 60 to about 80° C. and $T_2$ is about 10 to about 50° C.

According to an aspect of the present disclosure, the washed transition metal-supported catalyst may contain 200 ppm or less of unsupported transition metal and retain at least 80% of its catalytic activity compared to the initial catalytic activity.

According to an aspect of the present disclosure, the transition metal may include one or two or more selected from the group consisting of titanium (Ti), zirconium (Zr), hafnium (Hf), vanadium (V), niobium (Nb), and tantalum (Ta).

According to an aspect of the present disclosure, the support may be prepared by contacting magnesium chloride and ethanol to generate a solid support and then contacting the solid support with an organoaluminum compound.

According to an aspect of the present disclosure, the organic solvent may contain a $C_1$-$C_{10}$ hydrocarbon compound.

According to an aspect of the present disclosure, the hydrocarbon compound may contain n-hexane and/or n-heptane.

According to an aspect of the present disclosure, the washing in step S2) may be performed one to four times at $T_1$ and one to four times at $T_2$.

According to an aspect of the present disclosure, the total amount of the organic solvent used in the first stage and the second stage may be about 2,000 to about 4,000 parts by weight with respect to 100 parts by weight of the transition metal-supported catalyst.

According to an aspect of the present disclosure, in step S3), a cocatalyst and/or a molecular weight regulator may be introduced into the reactor with the washed transition metal-supported catalyst.

According to an aspect of the present disclosure, the molecular weight regulator may be a $C_1$-$C_5$ hydrocarbon.

Other features and aspects will be apparent from the following detailed description, the drawings, and the claims.

BRIEF DESCRIPTION OF THE DRAWINGS

FIG. 1 is a graph showing changes in content of unsupported Ti and catalytic activity according to a washing temperature.

DETAILED DESCRIPTION OF EMBODIMENTS

Hereinafter, the present disclosure will be described in more detail through exemplary embodiments. However, each of the following exemplary embodiments are merely one reference example for describing the present disclosure in detail, and the present disclosure is not limited thereto and may be implemented in various forms.

In addition, unless otherwise defined, all the technical terms and scientific terms have the same meanings as commonly understood by those skilled in the art to which the present disclosure pertains. The terms used in the description of the present disclosure are merely used to effectively describe a specific exemplary embodiment and are not intended to limit the present disclosure.

In addition, unless the context clearly indicates otherwise, singular forms used in the specification and the scope of the appended claims are intended to include plural forms.

In addition, unless explicitly described to the contrary, "comprising" any components will be understood to imply further inclusion of other components rather than the exclusion of any other components.

In addition, the term "and/or" used in the present disclosure includes any and all combinations of one or more related listed items.

The term "polyethylene wax" or "wax" described in the present disclosure refers to a low molecular weight material that is present in a liquid or solid state at room temperature within a weight average molecular weight range of about 600 to about 10,000 g/mol.

In general, when a transition metal-supported catalyst is washed at a temperature higher than $T_1$ to remove residual unsupported transition metal, catalytic activity of the catalyst is reduced. Likewise, in general, when a transition-metal supported catalyst is washed at a temperature lower than $T_2$, unreacted transition metal is not sufficiently removed. In addition, as the number of times of washing increases, the content of the unreacted transition metal decreases, however the catalytic activity may also be reduced accordingly. Further, environmental pollution and costs increase because a large amount of an organic solvent is used for washing.

The present disclosure provides a washing method that effectively removes unreacted transition metal from a transition metal-supported catalyst with a limited volume of solvent and maintains 80% or more of the catalytic activity of the transition metal-supported catalyst as compared to its activity before washing. In particular, the advantages of the method are achieved by dividing the washing of the transition metal-supported catalyst into two stages, each having a different temperature ($T_1$ and $T_2$).

Specifically, by washing at a first temperature $T_1$ and then at a second temperature $T_2$, catalyst activity in maintained, and at the same time, unreacted transition metal is removed to yield a transition metal-supported catalyst having a content of unreacted transition metal of 200 ppm or less. By using such a process, the generation of polyethylene wax in a polyethylene polymer produced using the transition metal-supported catalyst may be significantly minimized.

The present disclosure provides a method of producing a polyethylene polymer, the method comprising:

S1) introducing a transition metal into a support to generate a transition metal-supported catalyst, wherein the transition metal-supported catalyst has an initial catalytic activity;

S2) washing the transition metal-supported catalyst with an organic solvent a total of two to ten times in a first stage at a first temperature $T_1$ and in a second stage at a second temperature $T_2$ to generate a washed transition metal-supported catalyst;

S3) introducing the washed transition metal-supported catalyst into a reactor and then injecting ethylene gas into the reactor under conditions effective to produce a polyethylene polymer; and S4) washing the produced polyethylene polymer, wherein:

$T_1$ is 60 to 80° C., $T_2$ is 10 to 50° C., the washed transition metal-supported catalyst contains 200 ppm or less of unsupported transition metal, and the washed transition metal-support catalyst has a catalytic activity that is 80% or more of the initial catalytic activity.

In certain embodiments, step S1) comprises immobilizing a transition metal into a support to generate a transition metal-supported catalyst. In certain embodiments, step s1) comprises introducing or immobilizing a precursor transition metal into the support and subsequently transforming the precursor to generate a transition metal-supported catalyst.

In one embodiment, the washing in step S2) may be performed two to ten times in total in a first stage at the first temperature $T_1$ and in a second stage at the second temperature $T_2$, and specifically may be performed one to five times at the first temperature $T_1$ and one to five times at the second temperature $T_2$, but is not limited thereto.

In some embodiments, the amount of the unreacted transition metal in the washed transition metal-supported catalyst may be 200 ppm or less, specifically 170 ppm or less, more specifically 150 ppm or less, and still more specifically 130 ppm or less, but is not limited thereto.

According to an aspect of the present disclosure, the transition metal-supported catalyst may be obtained by immobilizing a transition metal on a support. In one embodiment, the transition metal-supported catalyst may be obtained by first contacting a transition metal precursor with a support then transforming the precursor to yield the transition metal on the support.

According to an aspect of the present disclosure, the transition metal may be one or two or more selected from the group consisting of titanium (Ti), zirconium (Zr), hafnium (Hf), vanadium (V), niobium (Nb), and tantalum (Ta), specifically, may be one or two or more selected from titanium, zirconium, and vanadium, and more specifically, may be titanium, but is not limited thereto.

According to an aspect of the present disclosure, the transition metal precursor may be a titanium halide compound. As an example, the titanium halide compound may be one or two or more selected from the group consisting of titanium tetrachloride, titanium tetrabromide, titanium tetraiodide, titanium trichloride, and titanium tribromide, and specifically, may be titanium tetrachloride, but is not limited thereto.

According to an aspect of the present disclosure, the support may be a porous support, specifically, may be one or two or more porous supports selected from the group consisting of a zeolite porous support, an aluminum oxide porous support, a silica porous support, and a magnesium porous support. In one embodiment, the support may be a magnesium porous support, but is not limited thereto.

In one embodiment, the magnesium porous support may be prepared by first preparing a solid support by contacting a magnesium compound and an alcohol compound to form a transition metal precursor and thereafter contacting the transition metal precursor with an organoaluminum compound. In one embodiment, the magnesium compound may be one, two, or more selected from the group consisting of a magnesium halide, an alkoxy magnesium halide, an aryloxy magnesium halide, alkoxy magnesium, aryloxy magnesium, an aryloxy magnesium halide, and a carboxylic acid salt of magnesium. In one embodiment, the magnesium compound may be a magnesium halide, but is not limited thereto.

In one embodiment, the magnesium halide may be one, two, or more selected from the group consisting of magnesium chloride, magnesium bromide, magnesium iodide, and magnesium fluoride. In one embodiment, the alkoxy magnesium halide may be one, two, or more selected from methoxy magnesium chloride, ethoxy magnesium chloride, isopropoxy magnesium chloride, butoxy magnesium chloride, and octoxy magnesium chloride. In one embodiment, the aryloxy magnesium halide may be phenoxy magnesium chloride and/or methylphenoxy magnesium halide, and the alkoxy magnesium may be one or two or more selected from the group consisting of ethoxy magnesium, isopropoxy magnesium, butoxy magnesium, n-octoxy magnesium, and 2-ethyl-hexoxy magnesium. In one embodiment, the aryloxy magnesium may be phenoxy magnesium and/or dimethyl phenoxy magnesium, and the carboxylic acid salt of magnesium may be magnesium laurate and/or magnesium stearate.

In one embodiment, the alcohol compound may be a $C_1$-$C_{18}$ linear or branched aliphatic alcohol, alicyclic alcohol, or aromatic alcohol. In one embodiment, the alcohol compound may be one, two, or more selected from the group consisting of methanol, ethanol, n-propanol, i-propanol, n-butanol, n-hexanol, 2-ethyl hexanol, n-octanol, i-octanol, n-stearyl alcohol, cyclopentanol, cyclohexanol, and ethylene glycol.

In one embodiment, a transition metal-supported catalyst may be prepared by mixing magnesium halide and the alcohol compound. In one embodiment, the magnesium halide and the alcohol compound may be mixed at a molar ratio of about 1:0.1 to 10, or specifically a molar ratio of about 1:2 to about 5, but is not limited thereto.

An organoaluminum compound may then be introduced into the prepared solid support under conditions effective to allow a reaction to proceed, thereby preparing a magnesium porous support.

In one embodiment, the organoaluminum compound may be one or two or more selected from the group consisting of triethylaluminum, triisobutylaluminum, trihexylaluminum, diethylaluminum hydride, diisobutylaluminum hydride, diethylaluminum chloride, di-n-propylaluminum chloride, di-n-butylaluminum chloride, di-i-butylaluminum chloride, ethylaluminum dichloride, i-butylaluminum dichloride, and n-octylaluminum. In one embodiment, the organoaluminum compound is one or two or more selected from the group consisting of diethylaluminum chloride, di-n-propylaluminum chloride, di-n-butylaluminum chloride, and di-i-butylaluminum chloride, but is not limited thereto.

The magnesium compound and the organoaluminum compound may be mixed at a molar ratio of about 1:1 to about 5, such as at a molar ratio of about 1:1 to about 3, but is not limited thereto.

In another embodiment, a transition metal-supported catalyst may be prepared by introducing a titanium halide into a magnesium porous support, wherein the ratio of the magnesium porous support and the titanium halide to the magnesium compound of the magnesium porous support is a molar ratio of 1:1 to 30, or a molar ratio of 1:2 to 5, but is not limited thereto.

As described in step S2), the transition metal-supported catalyst may be washed with an organic solvent to remove residual unreacted transition metal.

According to an aspect of the present disclosure, the organic solvent may contain a $C_1$-$C_{10}$ hydrocarbon compound, such as n-hexane and/or n-heptane, but is not limited thereto.

According to an aspect of the present disclosure, total amount of the organic solvent used in the first stage and the second stage washing may be about 2,000 to about 4,000 parts by weight with respect to 100 parts by weight of the transition metal-supported catalyst.

In one embodiment, a temperature difference between the first temperature $T_1$ and the second temperature $T_2$ may satisfy the following Expression 1. In certain embodiments, $T_1$ and $T_2$ satisfy the following Expression 2, and more specifically may satisfy the following Expression 3, but is not limited thereto.

$$10° \text{ C.} \leq T_1 - T_2 \leq 70° \text{ C.} \quad \text{[Expression 1]}$$

$$20° \text{ C.} \leq T_1 - T_2 \leq 50° \text{ C.} \quad \text{[Expression 2]}$$

$$30° \text{ C.} \leq T_1 - T_2 \leq 40° \text{ C.} \quad \text{[Expression 3]}$$

In certain embodiments, the number of times of washing may be one to four at $T_1$ and one to four at $T_2$, wherein the total number of times of washing is five or fewer. In such instances, it may be possible to efficiently remove unreacted transition metal while maintaining a desired level of catalytic activity. In certain embodiments, washing in step S2) is performed twice at $T_1$ and three times at $T_2$. When such methods are used, it is possible to efficiently remove unreacted transition metal from a transition metal-supported catalyst with a limited amount of the solvent, and at the same time, maintain 80% or more of the catalytic activity compared to that before washing.

According to an aspect of the present disclosure, a cocatalyst and/or a molecular weight regulator may be introduced into the reactor together with the washed transition metal-supported catalyst in step S3). The cocatalyst is not limited and may be any cocatalyst used by those skilled in the art. Examples of suitable cocatalysts include organoaluminum compounds, such as trialkylaluminum compounds having an alkyl group having 1 to 6 carbon atoms. In certain embodiments, triethylaluminum or triisobutylaluminum are used as an organoaluminum compound, but are not limited thereto as long as it is used by those skilled in the art.

The molecular weight regulator is likewise not limited thereto as long as it is a molecular weight regulator used by those skilled in the art. In one embodiment, the molecular weight regulator is a $C_1$-$C_5$ hydrocarbon, but is not limited thereto. In certain embodiments, when a $C_1$-$C_5$ hydrocarbon is used as a molecular weight regulator, reactivity is maintained because the molecular weight regulator it is not bulky and separation and recovery from the solvent is easy.

The conditions effective to produce polyethylene in the reactor are well known by one of skill in the art and are not limited. Typical conditions include, but are not limited to, elevated temperature (e.g., 70-150° C.) and/or elevated pressure (e.g., atmospheric pressure—30 atm).

Hereinafter, the present disclosure will be described in more detail with reference to Examples and Comparative Examples. However, the following Examples and Comparative Examples are only examples for describing the present disclosure in more detail, and the scope of the present disclosure is not limited by the following Examples and Comparative Examples.

[Measurement of Physical Properties]

[Measurement of Catalytic Activity]

Catalytic activity was confirmed through a polymerization reaction, 10 mg of a catalyst and 2,000 μmol of TEAL as a cocatalyst were added to 1.5 L of hexane at 80° C., 4 bar of $H_2$, and 4 bar of ethylene, and activity was measured using the amount of polymer obtained after polymerization at a total pressure of 8 bar for 30 minutes.

1. Method of Preparing Transition Metal-Supported Catalyst

Preparation Example 1

A 2 L volumetric double jacket glass reactor equipped with a stirrer was filled with 30 g (0.32 mol) of magnesium chloride powder in a nitrogen atmosphere, and 576 ml (4.41 mol) of hexane was added thereto, thereby preparing a mixture. The mixture was stirred for 1 hour at 25° C., 55 ml (0.95 mol) of ethyl alcohol was added dropwise to the mixture for 1 hour, and then the mixture was reacted by stirring for 1 hour.

Thereafter, the mixture was cooled to a temperature of 20° C., 278 ml (1.67 mol) of a hexane solution containing 30 wt % of triethylaluminum was added dropwise for 1 hour, and the mixture was stirred for 30 minutes.

Thereafter, the mixture was cooled to 10° C., 209 g (1.1 mol) of titanium tetrachloride was added, and a reaction was performed at 80° C. for 2 hours. Thereafter, the mixture was washed several times with hexane at 25° C., wherein the weight of the solvent used each time was seven times the weight of the catalyst.

Preparation Example 2

A 2 L volumetric flask equipped with a stirrer was filled with 50 g (0.53 mol) of magnesium chloride powder in a nitrogen atmosphere, and 246 ml of decane, 125 g (0.37 mol) of tetra-n-butoxy titanium, and 232 g (1.78 mol) of 2-ethylhexyl alcohol were added thereto. The mixture was heated to 130° C. and reacted by stirring for 3 hours in a nitrogen atmosphere.

The reactant of the homogeneous solution obtained as described above was cooled to room temperature, 315 ml (2.42 mol) of a hexane solution containing 15 wt % of triethylaluminum was added dropwise for 2 hours, and stirring was performed for 2 hours, thereby obtaining a slurry containing a white solid product. The solid product was separated from the slurry by filtration. 685 ml of hexane was added to the obtained solid product, and then 319 g (1.68 mol) of titanium tetrachloride was added and reacted for 3 hours. Thereafter, washing was performed several times with hexane, and the weight of the solvent used per time was seven times the weight of the catalyst.

Example 1

Example 1 was prepared according to the procedure of Preparation Example 1, except that mixture was washed twice at 70° C. and three times at 25° C.

Example 2

Example 2 was prepared according to the procedure of Preparation Example 1, except that the mixture was washed twice at 70° C. and three times at 40° C.

Comparative Example 1

Comparative Example 1 was prepared according to the procedure of Preparation Example 1, except that the mixture was washed five times at 70° C.

Comparative Example 2

Comparative Example 2 was prepared according to the procedure of Preparation Example 1, except that the mixture was washed ten times at 70° C.

Comparative Example 3

Comparative Example 3 was prepared according to the procedure of Preparation Example 1, except that the mixture was washed twice at 70° C. and three times at 60° C.

Comparative Example 4

Comparative Example 3 was prepared according to the procedure of Comparative Example 1, except that the washed transition metal-supported catalyst was further washed with hexane at 25° C.

FIG. 1 reports change in content of residual titanium (Ti) and catalytic activity for Examples 1 and 2 and Comparative Examples 1-3. Table 1 reports the amounts of residual unsupported Ti and the catalytic activity after washing of each of Examples 1 and 2 and Comparative Examples 1, 2, 3, and 4.

TABLE 1

| | Example 1 | Example 2 | Comparative Example 1 | Comparative Example 2 | Comparative Example 3 | Comparative Example 4 |
|---|---|---|---|---|---|---|
| Amount of residual unsupported Ti (ppm) | 190 | 120 | 95 | 30 | 100 | 45 |
| Catalytic activity (%) | 100% | 95% | 65% | 22% | 80% | 60% |

In both Examples 1 and 2, it could be confirmed that the amount of residual unsupported Ti was 200 ppm or less. On the other hand, in Comparative Examples 1 to 4, it could be appreciated that, although the content of the unreacted transition metal was reduced, as the number of times of washing increased, the catalyst activity was reduced from a minimum of 20% to a maximum of 78% when compared to those in Examples 1 and 2.

The catalyst of Preparation Example 2, which was washed in the same manner as in Examples 1 and 2 and Comparative Examples 1 to 4, yielded results similar to those of the catalyst of Preparation Example 1.

Specifically, when the catalyst of Preparation Example 2 was washed in the same manner as in Example 2, the amount of residual unsupported Ti was measured as 110 ppm. Catalytic activity was determined to be 96%, which was high compared to a small amount of residual unsupported Ti. On the other hand, when the catalyst of Preparation Example 2 was washed in the same manner as in Comparative Example 1, the amount of residual unsupported Ti was 100 ppm, which was relatively low, but the catalytic activity also measured lower at 70%.

Based on this fact, it was confirmed that when the catalyst was washed by the washing method of the present disclosure, the catalyst was effectively washed in a limited solvent and the catalytic activity was high compared to the amount of residual unsupported Ti.

[Polymerization of Ethylene]

Example 3

A stainless-steel autoclave with an internal volume of 3 L equipped with a magnetic stirrer was sufficiently substituted with nitrogen, a slurry containing 1.5 L of hexane, 2000 μmol of triethylaluminum as a cocatalyst, and 10 mg of the transition metal-supported catalyst of Example 2 was sequentially added.

Hydrogen was added to the inside of the autoclave to 4 bar, and stirring was started to adjust the internal temperature of the autoclave to 80° C. Here, polymerization was performed for 30 minutes by continuously adding 4 bar of ethylene gas to adjust the internal pressure of the autoclave to 8 bar.

After the polymerization was completed, the product was cooled, unreacted gas was removed, polyethylene was taken out and separated from the solvent by filtration, and drying was performed.

After the polymerization, 30 g of a polyethylene polymer was obtained, and the final content (%) of wax of the polymer was shown in Table 2.

Example 4

The catalyst of Preparation Example 2 was washed in the same manner as in Example 2, a polyethylene polymer was prepared under the same conditions as in Example 3, and the final content (%) of wax of the polymer was shown in Table 3.

Comparative Example 5

The same procedure as in Example 3 was performed, except that the transition metal-supported catalyst of Comparative Example 1 was used and 15 mg of the catalyst was added. After the polymerization, 30 g of a polyethylene polymer was obtained, and the final content (%) of wax of the polymer was shown in Table 2.

Comparative Example 6

The catalyst of Preparation Example 2 was washed in the same manner as in Comparative Example 1, a polyethylene polymer was prepared under the same conditions as in Example 3, and the final content (%) of wax of the polymer was shown in Table 3.

TABLE 2

| | Example 3 | Comparative Example 5 |
|---|---|---|
| Wax (%) in final product | 0.86 | 3.10 |

TABLE 3

| | Example 4 | Comparative Example 6 |
|---|---|---|
| Wax (%) in final product | 0.90 | 3.50 |

In the case of the polyethylene polymer of Example 3, it could be appreciated that the content of wax was much lower than that of the polyethylene polymer of Comparative Example 5. In addition, in the case of the polyethylene polymer of Example 4, it could be appreciated that the content of wax was lower than that of the polyethylene polymer of Comparative Example 6.

Through this, it can be appreciated that when the catalyst is washed by the washing method of the present disclosure, it is possible to effectively remove an unsupported catalyst residue while maintaining the catalytic activity in the presence of a limited washing solvent, and finally, when polyethylene is polymerized using the catalyst washed by the washing method of the present disclosure, a content of wax is significantly low.

As set forth above, the methods provided herein may be used to minimize polyethylene wax produced during polymerization of ethylene by using the transition metal-supported catalyst washed in a certain temperature range and number of times in the polymerization process.

In addition, the present disclosure may provide a catalyst that may suppress environmental pollution and reduce costs due to waste solvent discharge by limiting the amount of organic solvent used as a catalyst washing solvent, and at the same time, has high catalytic activity compared to a small amount of unsupported catalyst residue.

Hereinabove, although the present disclosure has been described by specific matters, limited exemplary embodiments, and drawings, they have been provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to the described exemplary embodiments, but the claims and all modifications equal or equivalent to the claims are intended to fall within the spirit of the present disclosure.

What is claimed is:

1. A method of producing a polyethylene polymer, the method comprising:

S1) introducing a transition metal into a support to generate a composition comprising a transition metal-supported catalyst and unsupported transition metal, wherein the transition metal-supported catalyst has an initial catalytic activity;

S2) washing the transition metal-supported catalyst with an organic solvent a total of two to ten times in a first stage at a first temperature $T_1$ and with the organic solvent in a second stage at a second temperature $T_2$ to generate a washed transition metal-supported catalyst, S3) introducing the washed transition metal-supported catalyst into a reactor and then injecting ethylene gas into the reactor under conditions effective to produce a polyethylene polymer; and S4) washing the produced polyethylene polymer, wherein $T_1$ is 60 to 80° C. and $T_2$ is 10 to 50° C.

2. The method of claim 1, wherein composition comprises 200 ppm or less of unsupported transition metal and wherein the transition metal-supported catalyst has a catalytic activity that is 80% or more of the initial catalytic activity.

3. The method of claim 1, wherein the transition metal includes one or two or more selected from the group consisting of titanium (Ti), zirconium (Zr), hafnium (Hf), vanadium (V), niobium (Nb), and tantalum (Ta).

4. The method of claim 1, wherein the support is prepared by contacting magnesium chloride and ethanol and then introducing an organoaluminum compound.

5. The method of claim 1, wherein the organic solvent comprises a $C_1$-$C_{10}$ hydrocarbon compound.

6. The method of claim 5, wherein the hydrocarbon compound comprises n-hexane and/or n-heptane.

7. The method of claim 1, wherein the washing in step S2) is performed one to four times at $T_1$ and one to four times at $T_2$.

8. The method of claim 7, wherein the total amount of the organic solvent used in first stage and the second stage is 2,000 to 4,000 parts by weight with respect to 100 parts by weight of the transition metal-supported catalyst.

9. The method of claim 1, wherein step S3) comprises introducing the washed transition metal-supported catalyst into a reactor together with a cocatalyst and/or a molecular weight regulator.

10. The method of claim 9, wherein the molecular weight regulator is a C1-C5 hydrocarbon.

11. The method of claim 1, wherein a temperature difference between the first temperature $T_1$ and the second temperature $T_2$ satisfies: $10° C. \leq T_1 - T_2 \leq 70° C.$

12. The method of claim 1, wherein the washing in step S2) is performed twice at $T_1$ and three times at $T_2$.

13. The method of claim 1, wherein the transition metal is titanium.

14. The method of claim 1, wherein $T_1$ is 65 to 75° C. and $T_2$ is 20 to 45° C.

* * * * *